(12) United States Patent
Roh et al.

(10) Patent No.: US 7,457,304 B2
(45) Date of Patent: Nov. 25, 2008

(54) METHOD FOR SERVICE DISCOVERY IN MOBILE AD-HOC NETWORK

(75) Inventors: Yong-sung Roh, Icheon-si (KR); Jae-hoon Kim, Seoul (KR); Kyung-lim Kang, Suwon-si (KR); Young-bae Ko, Gunpo-si (KR); Shubhranshu Singh, Yongin-si (KR); Young-gon Choi, Suwon-si (KR); Chang-seok Oh, Cheongiu-si (KR); Jung-ho Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 535 days.

(21) Appl. No.: 11/125,237

(22) Filed: May 10, 2005

(65) Prior Publication Data

US 2005/0254472 A1    Nov. 17, 2005

(30) Foreign Application Priority Data

May 11, 2004    (KR) ...................... 10-2004-0033137

(51) Int. Cl.
*H04L 12/56* (2006.01)
(52) U.S. Cl. ...................... 370/406; 370/274; 370/315; 455/11.1; 455/426.1; 455/428; 455/456.3
(58) Field of Classification Search .............. 455/456.3, 455/414.3, 414.2, 426.1, 428, 454, 11.1; 370/338, 349, 274, 315, 492, 501, 406; 701/207, 701/208, 209, 211, 213, 222

See application file for complete search history.

(56) References Cited

U.S. PATENT DOCUMENTS

| 5,987,011 | A | * | 11/1999 | Toh ........................... 370/331 |
| 6,130,881 | A | * | 10/2000 | Stiller et al. ................. 370/238 |
| 7,133,373 | B2 | * | 11/2006 | Hester et al. ................. 370/311 |
| 7,164,885 | B2 | * | 1/2007 | Jonsson et al. ............. 455/41.2 |
| 7,266,085 | B2 | * | 9/2007 | Stine ........................... 370/252 |
| 2003/0033394 | A1 | * | 2/2003 | Stine ........................... 709/222 |
| 2004/0203611 | A1 | * | 10/2004 | Laporta et al. ........... 455/412.1 |
| 2004/0233881 | A1 | * | 11/2004 | Kang et al. ................. 370/338 |
| 2005/0041627 | A1 | * | 2/2005 | Duggi ........................ 370/338 |
| 2005/0153725 | A1 | * | 7/2005 | Naghian et al. ............ 455/520 |
| 2005/0272443 | A1 | * | 12/2005 | Hose et al. ............... 455/456.1 |

FOREIGN PATENT DOCUMENTS

KR    2003-0088203 A    11/2003

* cited by examiner

*Primary Examiner*—Dwayne D. Bost
*Assistant Examiner*—James D Ewart
(74) *Attorney, Agent, or Firm*—Sughrue Mion, PLLC

(57) ABSTRACT

A method for a hybrid service discovery adapting between push-based and pull-based schemes in a mobile ad-hoc network and a system thereof. The method includes periodically transmitting a first control packet for providing service information from a service provider that is capable of providing a service to nodes located in a specified advertisement zone, transmitting a second control packet requesting the service from a service demander to one or more nodes in a network, and transmitting a third control packet including path information of the service provider if at least one of the nodes located within the advertisement zone and the service provider receives the second control packet. The method and the system can reduce the amount of control packet transmission and minimize an end-to-end delay.

19 Claims, 8 Drawing Sheets

METHOD FOR SERVICE DISCOVERY IN MOBILE AD-HOC NETWORK

This application claims benefit under 35 U.S.C. § 119 (a) from Korean Patent Application No. 2004-33137, filed on May 11, 2004, the entire content of which is incorporated herein by reference.

BACKGROUND OF THE INVENTION

1. Field of the Invention

The present invention relates to a method for service discovery in a mobile ad-hoc network and a system thereof. More particularly, the present invention relates to a method for a hybrid service discovery adapting between push-based and pull-based schemes in a mobile ad-hoc network and a system thereof, which makes it possible to use a service in the mobile ad-hoc network in a manner that a node that provides the service transmits a control packet by a push-based method and a node that intends to use the service transmits the control packet by a pull-based method.

2. Description of the Related Art

A mobile ad-hoc network (hereinafter referred to as 'MANET') is a network autonomously constructed among nodes having mobility without the help of the existing environments. All nodes in MANET are mobile, and thus the network is characterized by a very dynamic and flexible structure. When using such a MANET, communications among users can be supported without the existing Internet-based resources and the distance limitations for communications can be eliminated by a multi-hop support. According to these characteristics, MANET has an advantage that it can support users' communications any time and anywhere. Accordingly, MANET has attracted a great deal of interest for its potential as the core network technology to cope with ubiquitous environments in the future.

Service discovery schemes for discovering and automatically setting diverse network resources, for example, various kinds of devices such as network printers, video appliances, and television receivers, and various kinds of servers such as FTP servers and streaming servers, dispersed on a network, have become a matter of growing concern. These schemes have great advantages in that even a user who has no expert knowledge of networks can conveniently use network resources. Particularly, since it is very difficult for a user to manually perform a setting operation in a very dynamic ad-hoc network such as a MANET, it is much more necessary to provide the service discovery function in a MANET.

Accordingly, research for service discovery methods in MANET has been actively performed heretofore. However, since routing support in a very dynamic MANET environment has performance limits, the improvement of the service discovery method is quite restricted.

The service discovery method on MANET can be divided into a centralized method and a decentralized (that is, distributed) method in accordance with existence or nonexistence of a centralized service manager.

In the centralized service discovery method, a separate server that is a service directory for providing kinds of devices and their IDs available in the network is provided. A node that can provide services such as printing and so on (hereinafter referred to as a 'service provider') registers kinds of services and their IDs provided by the node itself in the service directory. A node that intends to use the services (hereinafter referred to as a 'service demander') accesses the corresponding server and discovers a service provider that can provide the service desired by the service demander. However, since this method has a network structure seriously depending on the service directory, it is not suitable to the MANET environment. Particularly, if the service directory server itself moves from MANET and becomes unavailable, all nodes in the network cannot use the services.

In contrast, in the decentralized service discovery method, a separate directory server is not provided but every node in the network obtains information about a service provider. The decentralized service discovery method is divided into a push-based method and a pull-based method in accordance with the subject of transaction.

According to the push-based method, a service provider periodically transmits its information. A service demander stores such information, and if the corresponding service provider is needed, the service demander discovers and uses the service provided by the service provider. In this method, since the service information should be periodically transmitted to the entire network, a large number of control packets are produced in proportion to the number of service providers. This causes the performance of the entire network to deteriorate.

According to the pull-based method, a service demander itself discovers a service provider by transmitting a request message to the entire network at a time point when the corresponding service is needed. This method can reduce the number of control packets in the network in comparison to the push-based method. However, a process of discovering the service provider is additionally needed, and this causes a time delay in using the service.

SUMMARY OF THE INVENTION

The present invention has been developed in order to solve the above drawbacks and other problems associated with the conventional arrangement.

An aspect of an exemplary embodiment of the present invention is to provide an optimized method for service discovery in a mobile ad-hoc network (MANET) by combining push-based and pull-based schemes. The method for service discovery according to an exemplary embodiment of the present invention basically involves performing a service discovery process in a similar manner to the push-based method. However, the method involves creating an advertisement zone, and storing, in advance, information about service providers in the advertisement zone. By doing this, the method reduces an end-to-end delay that is a drawback of the push-based method. Since an advertisement of service information over the entire network causes an abrupt increase of control packets thereby causing excessive traffic, the method for service discovery according to an exemplary embodiment of the present invention dynamically adjusts the size of the advertisement zone on the basis of the frequency of service requests. Consequently, an exemplary embodiment of the present invention provides a service discovery method optimized in the MANET environment by minimizing the number of control packets through the above-described method.

The foregoing and other objects and advantages are substantially realized by providing a method for service discovery in a mobile ad-hoc network, according to an exemplary embodiment of the present invention, comprising periodically transmitting a first control packet for providing information relating to a service from a service provider which is capable of providing the service to nodes located in a specified advertisement zone; transmitting a second control packet for requesting the service from a service demander which intends to use the service, to all of the nodes in a network; and transmitting, by at least one of the nodes located in the specified advertisement zone and the service provider that receives the second control packet, a third control packet including path information of the service provider, to the service demander.

The method may further comprise adjusting the advertisement zone in proportion to a degree of use of the third control packet.

The method may further comprise using the service by exchanging data between the service demander and the service provider through a shortest path among paths through which the third control packet is received.

The method may further comprise periodically adjusting the advertisement zone in proportion to a degree of the service use.

The degree of the service use may be determined in consideration of information including the number of service demanders that use the service, and the number of sessions between the service provider and the service demander.

The advertisement zone may be adjusted using the number of hops.

The node in the advertisement zone receives path information from the service provider, prepares a service routing table including a service type, an ID of the service provider, a next hop, and a hop count, and transmits the third control packet to the service demander with reference to the service routing table, and the service routing table may be re-created whenever new path information is received, and information of the service routing table that is not used for a predetermined time is not used.

The first control packet may include the service type, the ID of the service provider, an ID of the node, and a hop count, and the second control packet may include the service type, the ID of the service demander, an ID of the node, and a hop count.

The nodes located in the advertisement zone may track the path through which the first control packet is received using the ID of the node and the hop count of the first control packet, and may track a path through which the second control packet is received using the ID and the hop count of the service demander.

The method may further comprise periodically transmitting the first control packet by a push-based method, and transmitting the second control packet by a pull-based method.

The method may further comprise, if a second service demander, which is not the service demander among the nodes of the network to which the service demander belongs and intends to use the service, broadcasts a second control packet for requesting the service to all of the nodes of the network, transmitting the third control packet from an intermediate node, which receives the second control packet among nodes located along a path through which the data is exchanged between the service demander and the service provider, to the second service demander through a reverse path through which the second control packet is received.

The intermediate node may be nearest to the second service demander among the nodes located along the path through which the data is exchanged between the service demander and the service provider.

The method may further comprise using the service, at the second service demander, by exchanging data with the service provider through a shortest path among the paths through which the third control packet is received.

Transmitting the third control packet from the intermediate node nearest to the second service demander through the reverse path through which the second control packet is received, may be performed while the service is used between the service demander and the service provider.

Consistent with the above aspect of an exemplary embodiment of the present invention, a mobile ad-hoc network system includes a service provider being able to provide a service and periodically transmitting a first control packet for providing service information to a node located in a specified advertisement zone; a service demander for transmitting a second control packet for requesting a service to all of the nodes of a network and intending to use the service; and a node, located in the advertisement zone, for transmitting a third control packet including path information of the service provider to the service demander through reverse a path through which the second control packet is received upon receiving the first and second control packets. If the third control packet is received, the service demander uses the service by exchanging data with the service provider through a shortest path among paths through which the third control packet is received.

The service provider periodically may adjust the advertisement zone in proportion to a degree of service use.

The system may further comprise an intermediate node located along a path through which data is exchanged between the service demander and the service provider, if a second service demander which is not the service demander among the nodes of the network to which the service demander belongs and intends to use the service, broadcasts the second control packet for requesting the service to all of the nodes of the network, the intermediate node, upon receiving the second control packet, transmitting the third control packet to the second service demander through a reverse path through which the second control packet is received. The second service demander uses the service by exchanging data through a shortest path among paths through which the third control packet is received from the service provider and the intermediate node.

The service provider may transmit the first control packet by a push-based method, and the service demander may transmit the second control packet by a pull-based method.

BRIEF DESCRIPTION OF THE DRAWINGS

The above aspects and features of the present invention will be more apparent by describing certain exemplary embodiments of the present invention with reference to the accompanying drawings, in which.

DETAILED DESCRIPTION OF THE EXEMPLARY EMBODIMENTS OF THE PRESENT INVENTION

Figure 1:
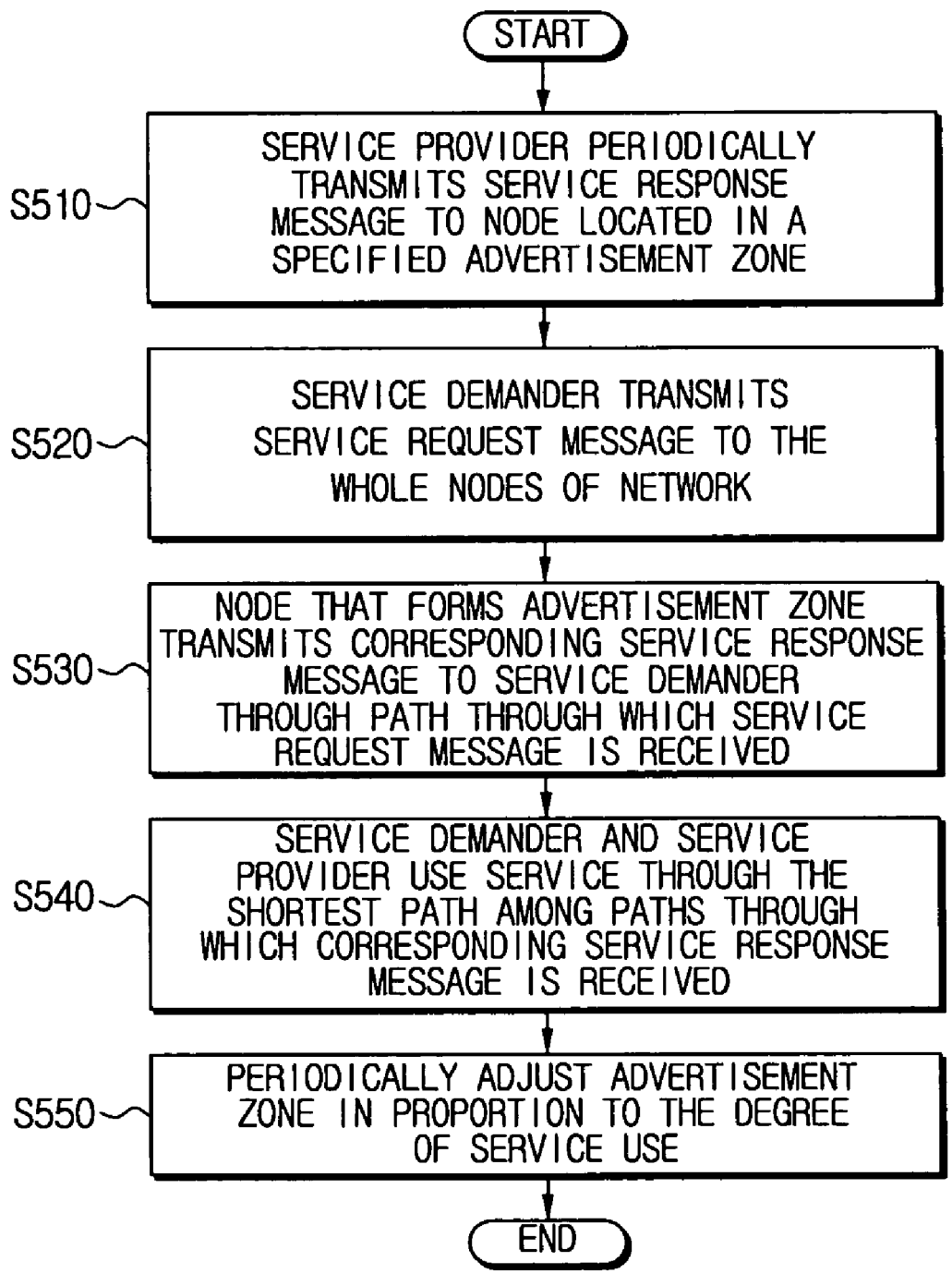
FIG. 1 is a flowchart illustrating a method for service discovery according to an exemplary embodiment of the present invention.

Certain exemplary embodiments of the present invention will be described in greater detail with reference to the accompanying drawings.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

The method for service discovery in a mobile ad-hoc network proposes a service discovery protocol in a hybrid approach in which push-based and pull-based approaches are combined. In the network to which the present invention is applied, one or more service providers and service demanders are included.

Figure 2:
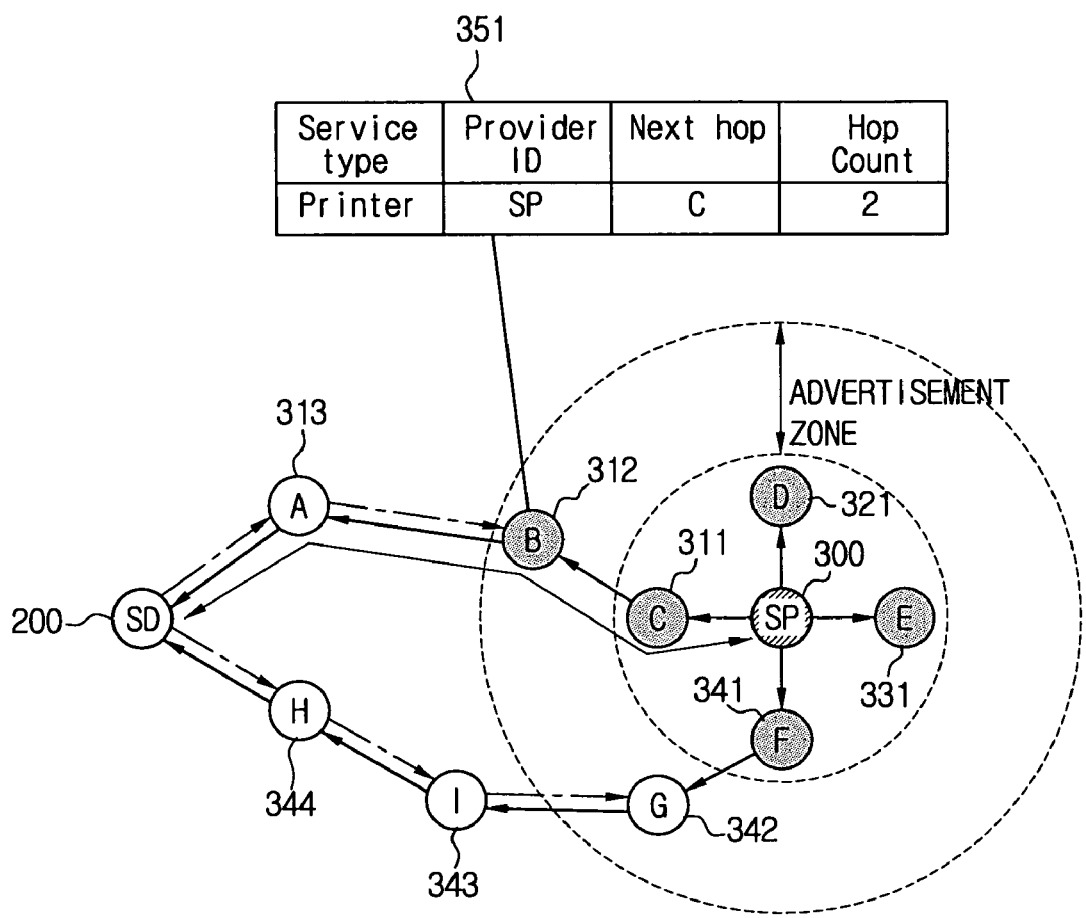
FIG. 2 is a view illustrating an example of a mobile ad-hoc network for explaining the method for service discovery as illustrated in FIG. 1.

FIG. 1 is a flowchart illustrating a method for service discovery according to an embodiment of the present invention. FIG. 2 is a view illustrating an example of a mobile ad-hoc network for explaining the method for service discovery as illustrated in FIG. 1. Referring to FIGS. 1 and 2, the service discovery method according to an exemplary embodiment of the present invention will be explained in detail.

The mobile ad-hoc network system according to an exemplary embodiment of the present invention includes a service demander 200, boundary nodes 311, 321, 331 and 341 and a service provider 300. In FIG. 1, only some of the nodes of the network, which are related to an exemplary embodiment of the present invention, are illustrated.

The service provider periodically broadcasts a first control packet including a service response message to nodes located in a specified advertisement zone at step S510. An example of the service response message is illustrated in Table 1 below. The service response message as shown in Table 1 refers to an example of the first control packet transmitted from a node B 312.

TABLE 1

| Service provider ID | Service Type | Node ID | Hop Count |
|---|---|---|---|
| SP | Printer | B | 2 |

In Table 1, the node ID indicates the node that has received the service response message, and the hop count indicates that the number of nodes up to a node SP 300 is 2, that is, the node B 312. In the first control packet transmitted from the node C 311, the node ID is C, and the hop count becomes 1.

Referring to FIG. 2, the service provider 300 periodically broadcasts the first control packet including the service response message to the nodes located within a specified advertisement zone. In an exemplary embodiment of the present invention, a printer service is taken as an example. Generally, the service provider 300, which serves as a destination with respect to general nodes, provides various kinds of devices such as a network printer, video appliance, and television receiver, and services such as a FTP server and a streaming server, to other nodes. Accordingly, the service provider periodically broadcasts the first control packet that contains the path of the service provider itself to the network, and thus the service demanders receiving the first control packet can easily access the service provider. However, the periodic broadcast of the first control packet to the entire network causes a great overhead on the network due to the characteristic of a MANET environment in which packets are transmitted in a hop-by-hop manner. Accordingly, it is required to adjust the number of first control packets being transmitted. In an exemplary embodiment of the present invention, the overhead is minimized by dynamically adjusting the transmission range of control packets on the basis of the degree of service use of the service demanders.

If the service demander has no information relating to the service provider which has the capability to provide the service that the service demander wants to use, the service demander (which intends to use the service) broadcasts a second control packet including a service request message to all the nodes of the network to which the service demander belongs at step S520. Steps S510 and S520 may be performed in the reverse order. Referring to FIG. 1, the service demander 200 broadcasts the second control packet including the service request message to all the nodes of the network. An example of the service request message is shown in Table 2 below. The service request message as shown in Table 2 refers to an example of the second control packet transmitted from a node SD 200.

TABLE 2

| Service demander ID | Service Type | Node ID | Hop Count |
|---|---|---|---|
| SD | Printer | SD | 0 |

In Table 2, the node ID indicates the node that originates the service request message, and the hop count indicates that the number of hops from the service demander, that is, the node SD 200. In the control packet in the node A 313 in FIG. 1, the node ID is A and the hop count becomes 1.

In MANET to which an exemplary embodiment of the present invention is applied, the service demander 200 which has no information relating to the service performs a service discovery operation according to a pull-based method. That is, whenever it is required to use a specified service, the service demander 200 broadcasts the service request message to the entire network, and waits for the service response message that includes path information of the service provider 300 that provides the service. The intermediate node which has information relating to the service or the service provider which has a capability to provide the service can transmit a service response message in response to the service request message.

If the service demander 200 is present within a specified advertisement zone of the service response message being periodically broadcast by the service provider 300, the service can be used by establishing a communication path to the service provider 300 using the service response message included in the first control packet being broadcast according to the push-based method.

The service provider 300 periodically broadcasts the first control packet including the service response message that includes its path information by a push-based method. At this time, the service provider 300 propagates the service response message to all neighboring nodes (which may be referred to as 'next hops') by a general broadcasting method in a manner that it does not transmit the message to the entire network but transmits the message to the nodes existing in the specified advertisement zone. The service provider 300 sets the size of the advertisement zone when it periodically transmits the service response message, and it is preferable to initially set the size of the advertisement zone to 1. The service response message includes path information. In order to set the advertisement zone, the service provider 300 adjusts the value of the hop limit. The first control packet that is transmitted is retransmitted with the hop limit value decreased at every hop of nodes. The first control packet is not re-transmitted to the neighboring nodes any more but is discarded if the hop limit value is set to zero. In FIG. 1, if the size of the advertisement zone is set to 1 (that is, the hop limit value is set to 1), the service response message will be transmitted only to the nodes C, D, E, and F (311, 321, 331, and 341). If the size of the advertisement zone is set to 2 (that is, the hop limit value is set to 2), the service response message is broadcast to the nodes C, D, E, and F (311, 321, 331, and 341) and to the nodes B and G (312 and 342) as well. An example of a message (that is, control packet) of the node SP 300 transmitted in order to adjust the hop limit of the advertisement zone to 2 is shown in Table 3.

TABLE 3

| Service provider ID | Service Type | Node ID | Hop Count | Advertisement Zone |
|---|---|---|---|---|
| SP | Printer | SP | 0 | 2 |

In Table 3, the advertisement zone means the number of hops which the first control message transmitted from the service provider. In the case of Table 3, the service provider has adjusted the hop limit value of the advertisement message to 2 hops.

At least one node (hereinafter referred to as a 'boundary node') that forms the advertisement zone among nodes located within the advertisement zone may respond with a third control packet including a corresponding service response message to the service demander upon receiving the second control packet from the service demander if the node has information relating to relevant service. Any node existing in the advertisement zone, even if the node is not the boundary node, can transmit the third control packet including the corresponding service response message to the service demander if the node has information relating to the relevant service. At this time, the control packet is transmitted through a path through which the service demander transmits the service request message at step S530. Each node can track the path through which the service demander transmits the service request message using a routing table. For example, the node B 312 can recognize that the node, which has transmitted the service request message to the node B 312, is the node A 313, and the node A 313 can recognize that the node, which has transmitted the service request message to the node A 313, is the node SD 200. Accordingly, the node B 312 can track that the path through which the service request message is transmitted refers to the node B 312, node A 313 and node SD 200.

The case where the size of the advertisement zone is set to 2 will be explained. The nodes C, D, E, and F (311, 321, 331, and 341) and the nodes B and G (312 and 342), which have received the service response message from the service provider 300, store the service response message in a service routing table. Referring to FIG. 2, an example of the service routing table 351 that is stored in the node B is illustrated. In the service routing table 351, a service type, a service provider ID (that is, provider ID), a neighboring node (that is, next hop) and a hop count are stored. In the embodiment, the service type is a printer, the service provider ID is a service provider (SP), the neighboring node is C, and the hop count is 2. When tracking the path of the service provider 300 that is a printer service provider having the ID of SP, it can be recognized that the node B has received the service response message from the node C 311, and the hop count (that is, the number of nodes) up to the service provider 300 is 2. Whenever new path information is received, the corresponding information is updated in the service routing table 351. Also, if the path information that is not refreshed by new control message over a specified time period cannot guarantee its usefulness, the corresponding value is deleted. If the nodes B and G (312 and 342), which have received the first control packet from the service provider 300, receive the second control packet including the service request message from the service demander 200, the nodes B and G (312 and 342) can respond to the service request message instead of the service provider 300. In this case, the nodes B and G (312 and 342) can create complete path information to the service provider 300 by combining the path information of the service demander 200 and the path information of the service provider 300. The third control packet including the corresponding service response message that includes the complete path information is transferred in the reverse order to the path through which the service demander 200 has transmitted the second control packet. Specifically, the third control packet that includes the path information is transmitted from the node B 312 to the service demander 200 via the node A 313, and is transmitted from the node G 342 to the service demander 200 via the nodes I 343 and H 344. If it is defined that a node that forms the advertisement zone is a boundary node, the boundary nodes are the nodes C, D, E, and F (311, 321, 331, and 341) if the hop limit value is 1, and the boundary nodes are the nodes B and G (312 and 342) if the hop limit value is 2.

The service demander, which has received the service response message, uses the service by exchanging data with the service provider through the shortest path among the paths through which the service response message is received at step S540. Referring to FIG. 2, if the service demander 200 receives the third control packet, the service demander 200 and the service provider 300 exchange the data through the shortest path, which is constructed with the node SD 200, node A 313, node B 312, node C 311 and node SP 300 in order, among the paths through which the third control packet is received to use the service. For example, if the service is the printer, the printing is performed.

The service provider periodically adjusts the advertisement zone in proportion to the degree of service use at step S550. Referring to FIG. 2, if the service is used between the service demander 200 and the service provider 300, the service provider 300 adjusts the advertisement zone by periodically checking the degree of service use. How to check the degree of service use depends on the purpose of implementation. For example, the service provider 300 can adjust the advertisement zone by checking the degree of use with reference to information about the number of sessions between the service demander 200 and the service provider 300 and the number of service demanders 200 that use the service. If the number of service demanders 200 that access the service provider 300 becomes large, this means that the corresponding service is actively used. In this case, the path information of the service provider 300 extends the size of the advertisement zone periodically advertised. This is because it is more advantageous that the nodes along the path obtains the path information to the service provider 300 in advance than the service demanders 200 transmit the service request message. If the degree of service use (for example, service request period) has a value larger than a predetermined threshold value, the service provider 300 extends the size of the advertisement zone by increasing the range of hops to which the first control packet is transmitted by a specified unit, for example, by 1, so that much more nodes can inform the service provider 300 of their path information. By contrast, if the degree of service use (for example, a service request period) has a value smaller than a predetermined threshold value, the service provider 300 reduces the size of the advertisement zone by decreasing the range of hops to which the first control packet is transmitted by 1, so that the number of control packets being transmitted can be reduced.

Figure 3:
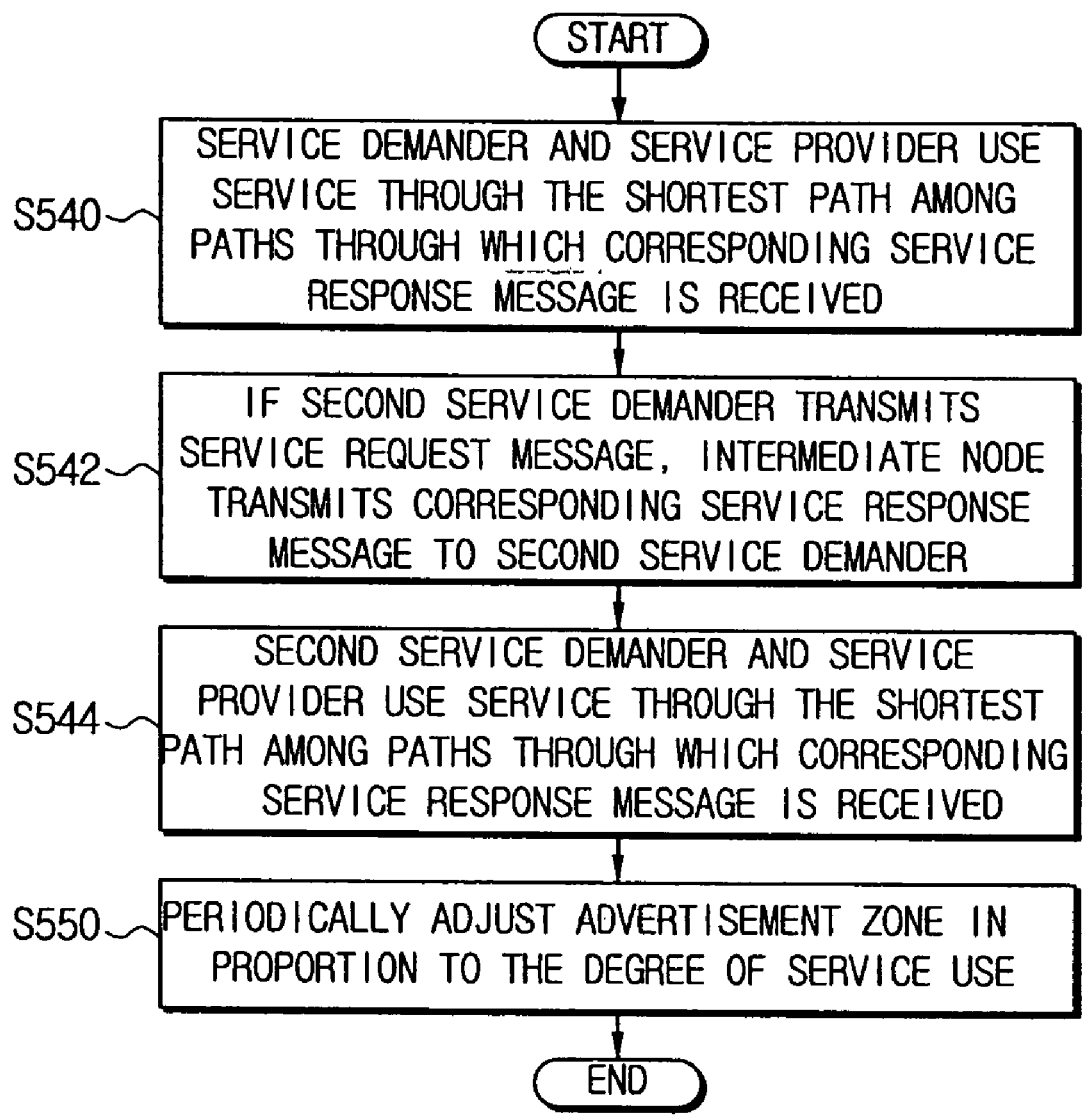
FIG. 3 is a flowchart illustrating a method for service discovery according to another exemplary embodiment of the present invention.
Figure 4:
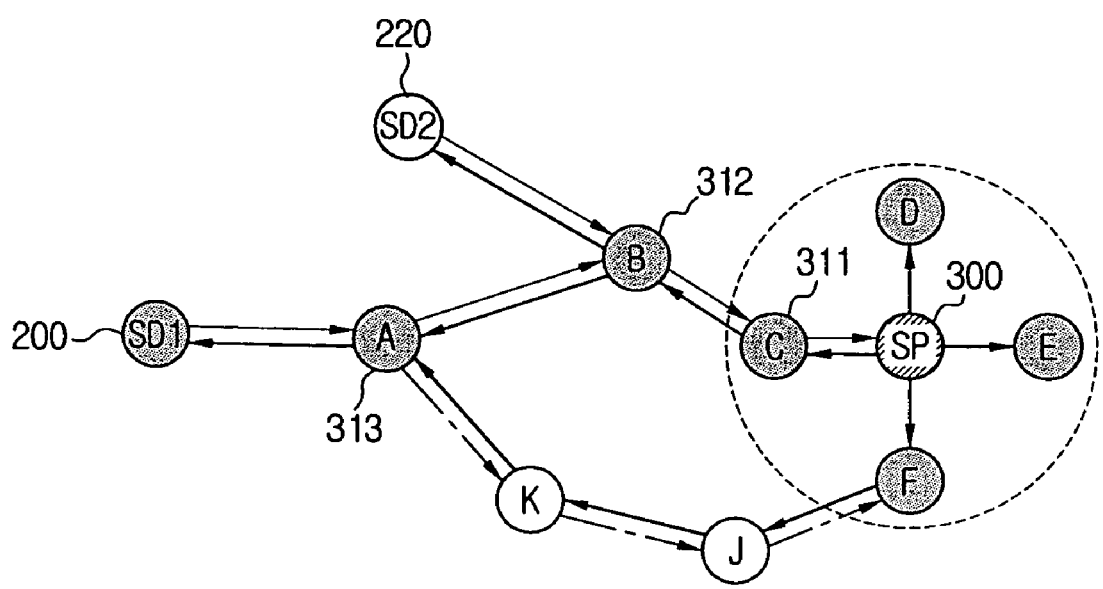
FIG. 4 is a view illustrating another example of a mobile ad-hoc network for explaining the method for service discovery as illustrated in FIG. 3.

FIG. 3 is a flowchart illustrating a method for service discovery according to another exemplary embodiment of the present invention. FIG. 4 is a view illustrating another example of a mobile ad-hoc network for explaining the method for service discovery as illustrated in FIG. 3. Referring to FIGS. 3 and 4, the service discovery method according to an exemplary embodiment of the present invention will be explained in detail. Explanation of overlapping aspects of FIGS. 1 and 2 will be omitted.

In the event that a node that intends to use the same service among nodes of the same network (hereinafter referred to as a 'second service demander') transmits a second control packet that is a service request message to all of the nodes of the network, an intermediate node, which receives the second control packet among the nodes of a path through which the service demander and the service provider use the same service, transmits the third control packet including the corresponding service response message to the second service request node at step S542. It is preferable that the intermediate node, which is nearest to the second service demander among intermediate nodes that transmit the corresponding service response message, transmit the service response message through the path through which the second control packet is received. The second service demander uses the service by exchanging data with the service provider through the shortest path among the paths through which the service response message is received at step S544.

Referring to FIG. 4, another service demander 220 that is not the service demander 200 can transmit the service request message (that is, the second control packet). In this case, in order to efficiently transfer the service information and to reduce the end-to-end delay, the nodes that take part in the service discovery process can send the path information of the service provider 300. Referring to FIG. 3, the node B 312 can transmit the corresponding service response message (that is, the third control packet). In the case that the node C 311 transmits the third control packet, the number of control packets increases in comparison to the case that the node B 312 transmits the service response message. Accordingly, it is preferable that the node B 312 transmits the service response message. At a time point when the service demander 200 exchanges data packets with the service provider 300 by obtaining the path information of the service provider 300, all the intermediate nodes that belong to the path may periodically receive the path information from the service provider 300. In this case, the path information transmitted from the service provider 300 may deviate from the advertisement zone and the hop limit value may be changed with reference to the routing table by the intermediate node. Also, unlike the periodic transmission through the service provider 300, the corresponding message is transmitted in the form of a unicast on the path to the service demander. In other words, the node, which has received the path information of the service provider 300, discovers path information to all the service demanders that receive the service via the node from the routing table and re-transmits the path information in the form of a unicast to all neighboring nodes on the path.

The intermediate node caching the path information of the service provider 300 can respond to the service request message from a certain node such as the node SD2 220 of FIG. 4. Accordingly, a prompt response to the service demander 220 becomes possible and thus the delay in the service request and response process can be reduced. Also, the newest service information path can be maintained in a MANET environment having a high mobility. Particularly, if the service requests are concentrated on a specified region in the network, a great amount of control message transmission and an end-to-end delay can be reduced.

According to an exemplary embodiment of the present invention, in the case of the service provider having a high frequency of access as a destination, a service discovery process approaching the push-based method is performed. Since the transmission range of the path information is extended, the number of nodes that can be directly accessed becomes large even if no information is requested to the service provider. Accordingly, the transmission of the service request message is not needed, and thus the time required for accessing the service provider can be greatly reduced. Also, in the case that a plurality of nodes intend to access a specified service provider at the same time, the problem of the conventional pull-based method where the entire network performance deteriorates due to an abrupt increase of the service request messages can be solved.

In contrast, if the service provider has a low frequency of access as a destination, a service discovery process similar to the pull-based method is performed. That is, the service provider reduces the advertisement zone in which the path information of the service provider is transmitted, and the service demander discovers the service provider by directly transmitting the service request message. In this case, unnecessary control packets can be reduced in comparison to the push-based method that transmits the path information to the entire network. Accordingly, in the MANET environment to which the present invention is applied, a prompt access of the service provider can be performed, and the entire network performance is greatly improved by reducing the number of control packets.

FIGS. 5A to 5D are comparative views illustrating the performances of a service discovery method according to an exemplary embodiment of the present invention, a push-based service discovery method and a pull-based service discovery method. The experimental environments in FIGS. 5A to 5D are shown in Table 4 below.

TABLE 4

| | |
|---|---|
| Simulator | NS-2 |
| Mac | 802.11 |
| Network Size | 650 * 650 |
| Performance Metric | Control Packet Overhead, End-to-End Delay |
| Simulation Time | 1500 sec |
| Frequency in User Request | 0.05, 0.10, 0.25, 0.5, 1.0 |
| Number of Nodes | 15, 30, 50, 75 |

Figure 5A:
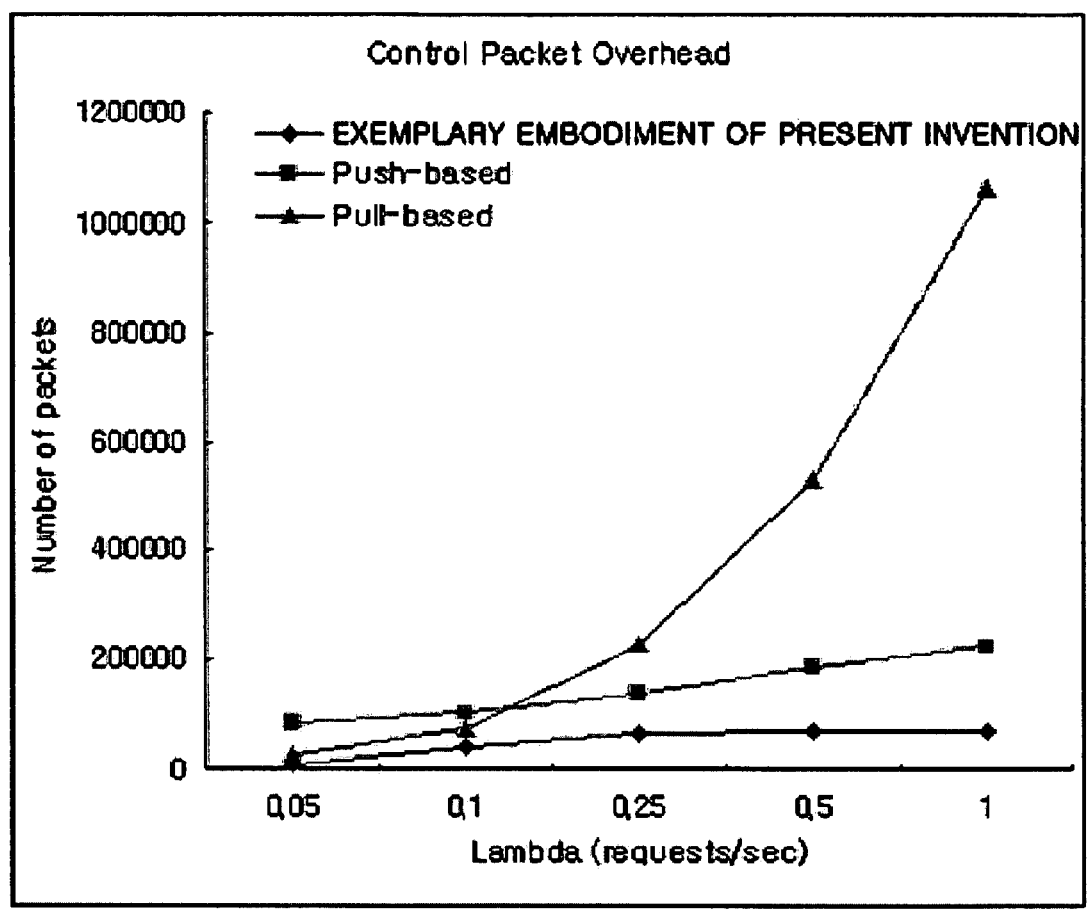
FIGS. 5A to 5D are comparative views illustrating the performances of a service discovery method according to an exemplary embodiment of the present invention, a push-based service discovery method and a pull-based service discovery method.
Figure 5B:
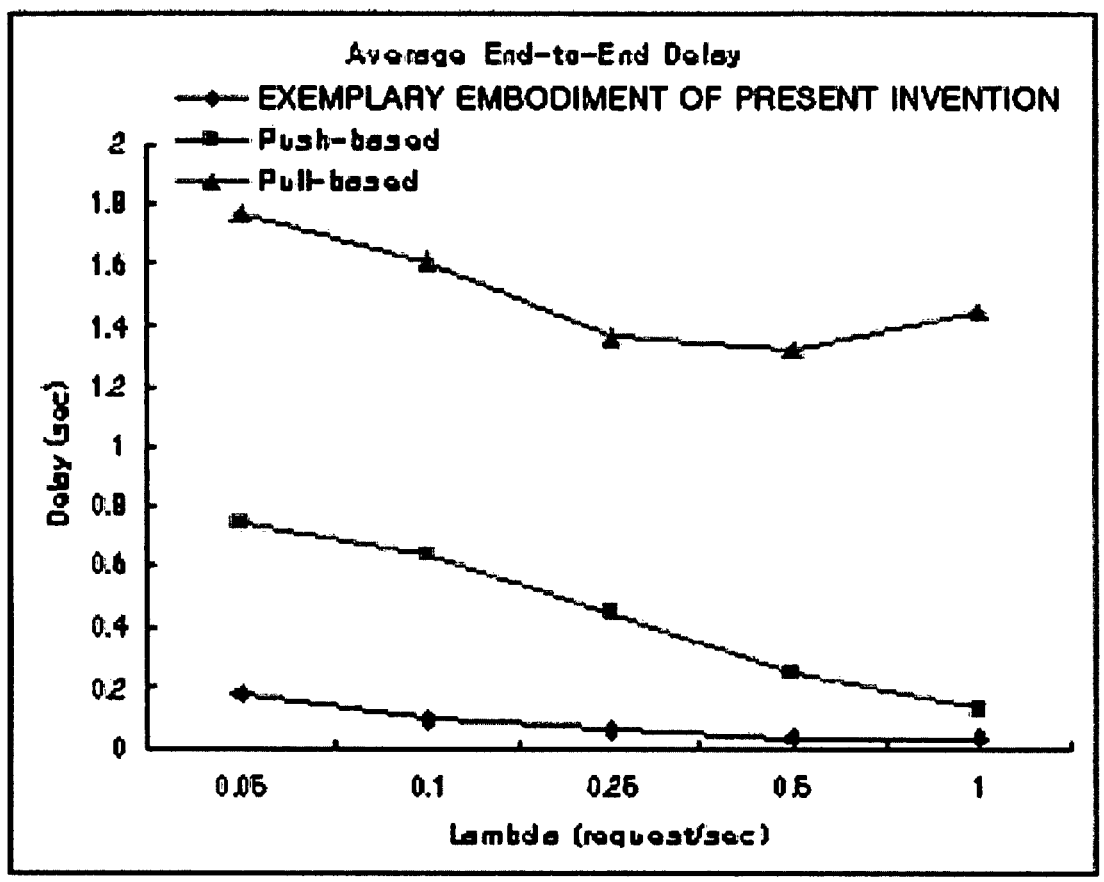

The experimental conditions in FIGS. 5A and 5B are shown in Table 5 below.

TABLE 5

| Var | Lambda |
|---|---|
| Pause | 1500 |
| node-num | 30 |

TABLE 5-continued

| service_num | 1 |
|---|---|
| advertisement period | 5 sec |

FIGS. 5A and 5B are comparative views showing the total number of control packet overheads and an average end-to-end delay, respectively. Referring to FIG. 5A, it can be seen that according to an exemplary embodiment of the present invention, the total number of control packet overhead remains at the smallest level regardless of the range of the lambda values. Table 6 below shows the values of FIG. 5A in detail.

TABLE 6

|  | Exemplary embodiment of present invention | Push-based | Pull-based |
|---|---|---|---|
| 0.05 | 10575 | 83458 | 28219 |
| 0.1 | 43830 | 101680 | 74484 |
| 0.25 | 63221 | 141495 | 229322 |
| 0.5 | 67996 | 185705 | 526393 |
| 1 | 68526 | 224317 | 1065146 |

Referring to FIG. 5B, it can be seen that according to an exemplary embodiment of the present invention, the average end-to-end delay remains smallest regardless of the range of the lambda values. Table 7 below shows the values of FIG. 5B in detail.

TABLE 7

|  | Exemplary embodiment of present invention | Push-based | Pull-based |
|---|---|---|---|
| 0.05 | 0.180106 | 0.742425 | 1.766971 |
| 0.1 | 0.093393 | 0.636332 | 1.608889 |
| 0.25 | 0.061452 | 0.446825 | 1.366344 |
| 0.5 | 0.034135 | 0.251577 | 1.315236 |
| 1 | 0.035582 | 0.133491 | 1.477399 |

Figure 5C:
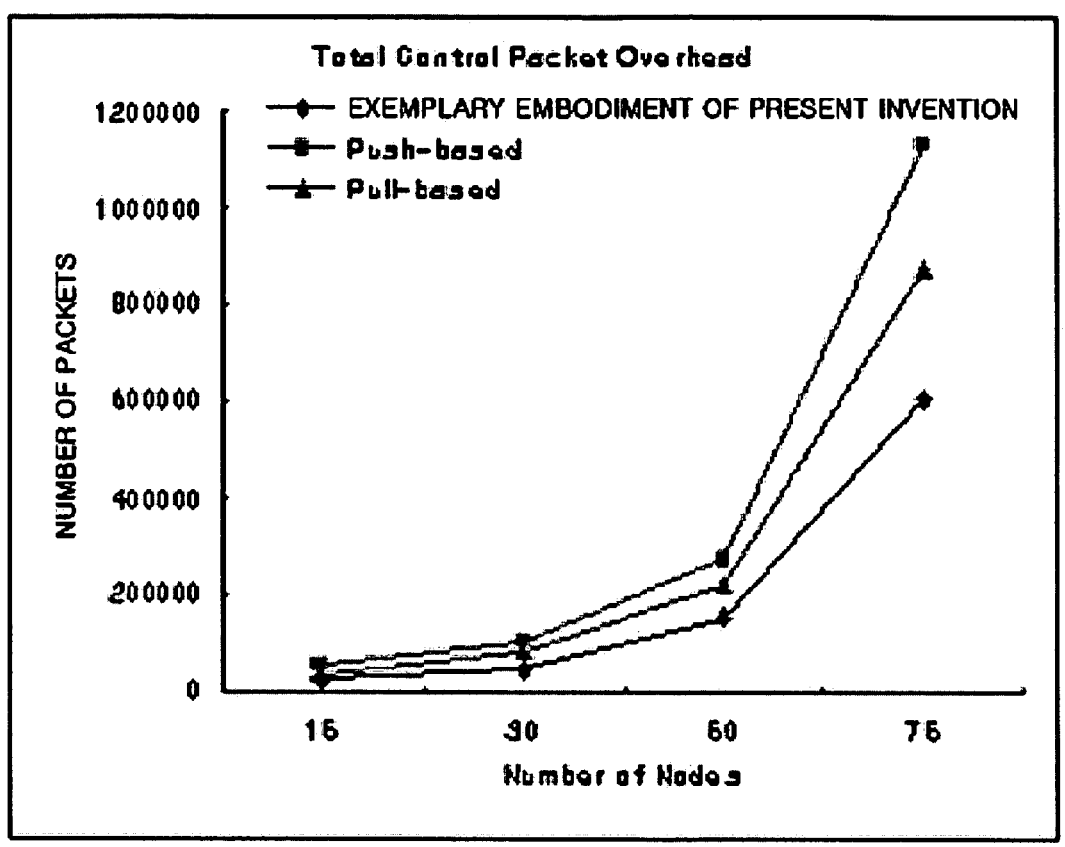
Figure 5D:
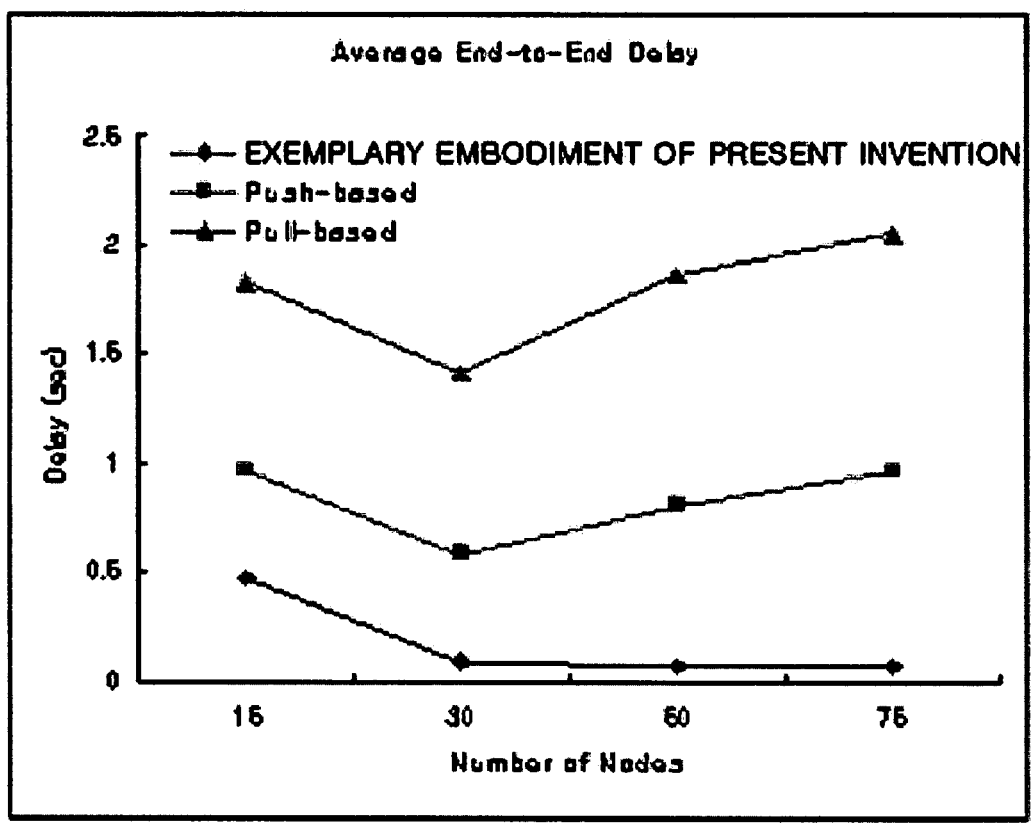

The experimental conditions in FIGS. 5C and 5D are shown in Table 8 below.

TABLE 8

| Var | node-num |
|---|---|
| Lambda | 0.1 |
| Pause | 1500 |
| Service | 1 |
| advertisement | 5 sec |

FIGS. 5C and 5D are comparative views showing the total number of control packet overhead and an average end-to-end delay, respectively. Referring to FIG. 5C, it can be seen that according to an exemplary embodiment of the present invention, the total number of control packet overhead remains smallest regardless of the range of the lambda values even if the experimental conditions are changed. Table 9 below shows the values of FIG. 5C in detail.

TABLE 9

| Nodes | Exemplary embodiment of present invention | Push-based | Pull-based |
|---|---|---|---|
| 15 | 25229 | 55846 | 37775 |
| 30 | 44538 | 105231 | 80505 |
| 50 | 153899 | 275021 | 221362 |
| 75 | 603940 | 1133601 | 873729 |

Referring to FIG. 5D, it can be seen that according to an embodiment of the present invention, the average end-to-end delay becomes smallest irrespective of the range of the lambda values. Table 10 below shows the values of FIG. 5D in detail.

TABLE 10

|  | Exemplary embodiment of present invention | Push-based | Pull-based |
|---|---|---|---|
| 15 | 0.472437 | 0.964287 | 1.821877 |
| 30 | 0.091474 | 0.582108 | 1.410376 |
| 50 | 0.063081 | 0.806514 | 1.857102 |
| 75 | 0.06922 | 0.965409 | 2.054098 |

According to an exemplary embodiment of the present invention, two schemes of service discovery and route discovery are combined, and thus the method and system can act as the routing protocol as well as the service discovery protocol. When using an exemplary embodiment of the present invention as the routing protocol, a destination node having a high frequency of access can periodically transfer its own path information as it adjusts the distance according to the frequency of access. In this case, in the same manner as the service discovery protocol, the network performance can be improved by preventing the generation of unnecessary control packets and reducing the end-to-end delay.

As described above, the push-based method and the pull-based method are combined, and the response delay and the number of control packets are reduced, so that the performance of the network can be improved.

Also, the advertisement zone of the push-based method is dynamically adjusted according to the degree of service use, and thus the service discovery method and mobile ad-hoc network system can be optimized to the MANET environment.

The foregoing exemplary embodiments are merely exemplary and are not to be construed as limiting the present invention. The present teaching can be readily applied to other types of apparatuses. Also, the description of exemplary embodiments of the present invention is intended to be illustrative, and not to limit the scope of the claims, and many alternatives, modifications, and variations will be apparent to those skilled in the art.

What is claimed is:

1. A method for service discovery in a mobile ad-hoc network, comprising:
   transmitting a first control packet for providing information relating to a service from a service provider which is capable of providing the service, to one or more nodes located in a specified advertisement zone;
   transmitting a second control packet for requesting the service from a first service demander which intends to use the service, to at least one node in a network;

transmitting, by at least one of the one or more nodes located in the specified advertisement zone and the service provider that receives the second control packet, a third control packet including path information of the service provider to the first service demander; and adjusting the advertisement zone in proportion to a degree of use of the third control packet.

2. The method according to claim 1, wherein said transmitting of said first control packet is performed periodically.

3. The method as claimed in claim 1, further comprising using the service by exchanging data between the first service demander and the service provider through a shortest path among paths through which the third control packet is received.

4. The method as claimed in claim 3, wherein a degree of the service use is determined based on at least a number of service demanders that use the service, and a number of sessions between the service provider and the first service demander.

5. The method as claimed in claim 3, wherein said at least one of the nodes in the advertisement zone receives path information from the service provider, prepares a service routing table including a service type, an ID of the service provider, a next hop, and a hop count, and transmits the third control packet to the first service demander with reference to the first service routing table, and the service routing table is re-prepared whenever new path information is received, and information of the service routing table that is not used for a predetermined time is not used.

6. The method as claimed in claim 3, wherein the first control packet includes a first service type, an ID of the service provider, an ID of said at least one of node, and a first hop count, and the second control packet includes a second service type, an ID of the first service demander, an ID of the at least one nodes, and a second hop count.

7. The method as claimed in claim 6, wherein the one or more nodes located in the advertisement zone track the path through which the first control packet is received using the ID of the one or more nodes and the hop count of the first control packet, and track a path through which the second control packet is received using the ID and the hop count of the first service demander.

8. The method as claimed in claim 3, wherein the operation of transmitting the first control packet comprises transmitting the first control packet by a push-based method, and the operation of transmitting the second control packet comprises transmitting the second control packet by a pull-based method.

9. A method for service discovery in a mobile ad-hoc network, comprising:

transmitting a first control packet for providing information relating to a service from a service provider which is capable of providing the service, to one or more nodes located in a specified advertisement zone;

transmitting a second control packet for requesting the service from a first service demander which intends to use the service, to at least one node in a network;

transmitting, by at least one of the one or more nodes located in the specified advertisement zone and the service provider that receives the second control packet, a third control packet including path information of the service provider to the first service demander;

using the service by exchanging data between the first service demander and the service provider through a shortest path among paths through which the third control packet is received; and adjusting the advertisement zone in proportion to a degree of the service use.

10. The method according to claim 9, wherein said operation of adjusting the advertisement zone is performed periodically.

11. A method for service discovery in a mobile ad-hoc network, comprising:

transmitting a first control packet for providing information relating to a service from a service provider which is capable of providing the service, to one or more nodes located in a specified advertisement zone;

transmitting a second control packet for requesting the service from a first service demander which intends to use the service, to at least one node in a network;

transmitting, by at least one of the one or more nodes located in the specified advertisement zone and the service provider that receives the second control packet, a third control packet including path information of the service provider to the first service demander; and using the service by exchanging data between the first service demander and the service provider through a shortest path among paths through which the third control packet is received, wherein the advertisement zone is adjusted using a number of hops.

12. A method for service discovery in a mobile ad-hoc network, comprising:

transmitting a first control packet for providing information relating to a service from a service provider which is capable of providing the service, to one or more nodes located in a specified advertisement zone;

transmitting a second control packet for requesting the service from a first service demander which intends to use the service, to at least one node in a network;

transmitting, by at least one of the one or more nodes located in the specified advertisement zone and the service provider that receives the second control packet, a third control packet including path information of the service provider to the first service demander;

using the service by exchanging data between the first service demander and the service provider through a shortest path among paths through which the third control packet is received, and further comprising the operation of, if a second service demander, which is not the first service demander among the at least one node of the network to which the first service demander belongs and which intends to use the service, broadcasts a second control packet for requesting the service to said at least one node of the network, transmitting the third control packet from an intermediate node, which receives the second control packet among nodes located along a path through which the data is exchanged between the first service demander and the service provider, to the second service demander through a reverse path through which the second control packet is received.

13. The method as claimed in claim 12, wherein the intermediate node is nearest to the second service demander among the nodes located along the path through which the data is exchanged between the first service demander and the service provider.

14. The method as claimed in claim 12, further comprising using the service, at the second service demander, by exchanging data with the service provider through a shortest path among the paths through which the third control packet is received.

15. The method as claimed in claim 12, wherein the operation of transmitting the third control packet from the intermediate node being nearest to the second service demander through the reverse path through which the second control packet is received, is performed while the service is used between the first service demander and the service provider.

16. A mobile ad-hoc network system comprising:
a first service provider configured to provide a service and transmit a first control packet for providing service information to at least one node located in a specified advertisement zone;
a first service demander configured to transmit a second control packet for requesting the service from one or more nodes of a network, wherein said first service demander intends to use the service; and
said at least one node, located in the advertisement zone, for transmitting a third control packet including path information of the service provider to the first service demander through a reverse path through which the second control packet is received, upon receiving the first and second control packets,
wherein, if the third control packet is received, the first service demander uses the service by exchanging data with the service provider through a shortest path among paths through which the third control packet is received,
wherein said transmission of said first control packet is performed periodically, and
wherein the service provider adjusts the advertisement zone in proportion to a degree of service use.

17. The system according to claim 16, wherein the service provider periodically adjusts the advertisement zone.

18. The system as claimed in claim 16, further comprising an intermediate node located along a path through which data is exchanged between the first service demander and the service provider, and if a second service demander, which is not the first service demander among the one or more nodes of the network to which the first service demander belongs and which intends to use the service, broadcasts the second control packet for requesting the service to the one or more nodes of the network, the intermediate node, upon receiving the second control packet, transmitting the third control packet to the second service demander through a reverse path through which the second control packet is received,
wherein the second service demander uses the service by exchanging data through a shortest path among paths through which the third control packet is received from the service provider and the intermediate node.

19. The system as claimed in claim 16, wherein the service provider transmits the first control packet by a push-based method, and the first service demander transmits the second control packet by a pull-based method.

* * * * *